July 22, 1958

M. GUERIN ET AL 2,844,718

PULSE GENERATING AND DISTRIBUTING DEVICES

Filed Dec. 22, 1953

INVENTOR.
MAURICE GUERIN
BY PAUL PIERRE NAMIAN
THEODORE HAFNER

INVENTOR.
MAURICE GUERIN
BY PAUL PIERRE NAMIAN
THEODORE HAFNER

INVENTOR.
MAURICE GUERIN
PAUL PIERRE NAMIAN
THEODORE HAFNER

INVENTOR.
MAURICE GUERIN
BY PAUL PIERRE NAMIAN
THEODORE HAFNER

United States Patent Office 2,844,718
Patented July 22, 1958

2,844,718

PULSE GENERATING AND DISTRIBUTING DEVICES

Maurice Guerin, Argenteuil, and Paul Pierre Namian, Asnieres, France, assignors to Societe d'Electronique et d'Automatisme, Courbevoie, France Application December 22, 1953, Serial No. 399,787

Claims priority, application France January 24, 1953

18 Claims. (Cl. 250—27)

The invention relates to improved devices for generating and distributing to a plurality of separate transmission channels a corresponding plurality of synchronisation signals bearing definite relationships with respect to their phases and having the same frequency of their recurring pulses.

The term "synchronising signal" or "synchronisation signal" here relates to any series of recurring calibrated pulses of uniform amplitude as can be used in transmission and computation systems presenting a pulse code modulation of their information signals. Such pulses may be termed "timing" or "clock" pulses in systems of these kinds and are mainly though not exclusively employed for such purposes as pulse-timer or pulse-shaper controls, switching controls and the like.

The term "main synchronisation signal" will be used for describing such a signal obtained from the activation of a multivibrator or the like, or from the alternating actuation of a bistable trigger stage, for instance a flip-flop device, or else from the periodical actuation of a univibrator, viz. a monostable trigger device, for instance a one-shot trigger stage.

An object of the invention is to provide an improved device for deriving from such a main synchronisation signal a plurality of further synchronisation signals distributed to a corresponding plurality of transmission channels, each of these further synchronisation signals bearing a definite frequency relation with respect to the frequency of the main synchronisation signal and also a definite and characteristic phase relation with respect to the phase of the main synchronisation signal.

A further object of the invention is an improved device for the generation and distribution of such further synchronisation signals presenting definite relative phase-shifts and also definite relative time-coverages in their respective voltage pulses.

Another object of the invention is an improved device for generating and distributing a plurality of such synchronisation signals under the control of a main synchronisation signal; this device presents a high degree of efficiency and reliability, being designed from component circuits presenting themselves such characterisations such as are known in pulse computation technique, viz. mainly from pulse-coincidence actuated pulse shapers, which are also called pulse-regenerative amplifiers. It may be recalled that in such a pulse-regenerative amplifier circuit, a coincidence between an input signal and the proper portion of a synchronisation signal is necessary to initiate an output pulse. If, therefore, the trailing edge of the input signal arrives prior to this portion of the synchronisation signal, the clock pulse in said synchronisation signal determines the timing of the start of the output pulse. To assure that the clock also determines the duration of the output pulse, a feedback path returns the output pulse in such a manner as to make it equivalent to the original input signal. In this fashion, the output pulse is maintained until terminated by the clock, even if the original input signal is removed.

These and other objects of the invention will be more fully described in connection with the drawings annexed herewith in which Figs. 1 and 2 respectively show pulse regenerative amplifier arrangements and associated networks constituting what may be called an "Or-gate" and an "And-gate," respectively.

Fig. 3 discloses a conventional representation of a pulse-regenerative amplifier, and Fig. 4 a graph illustrating the new kind of application which is intended for such a circuit in accordance with the invention;

Figure 11:
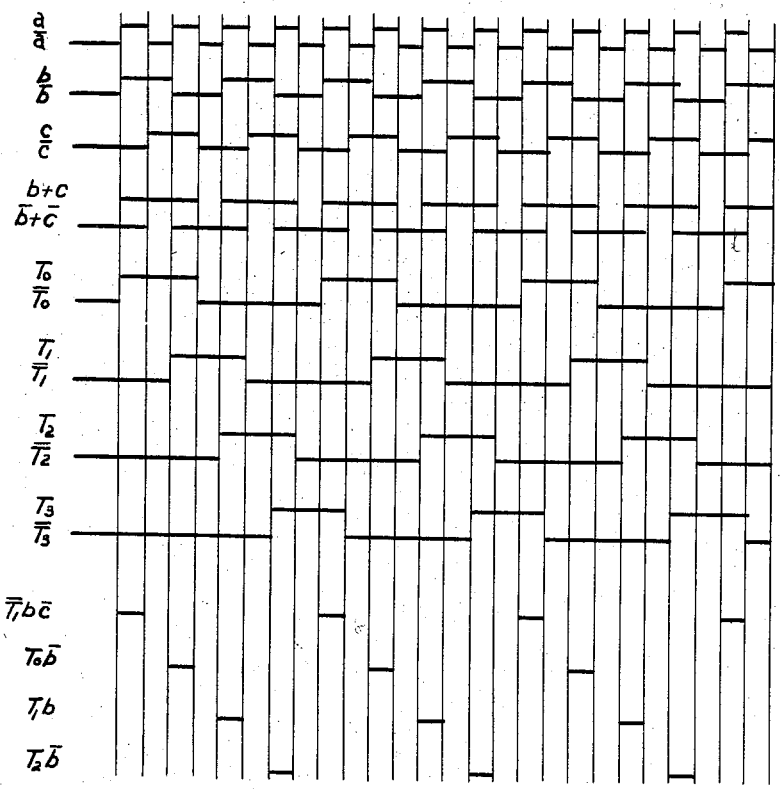
Figure 9:
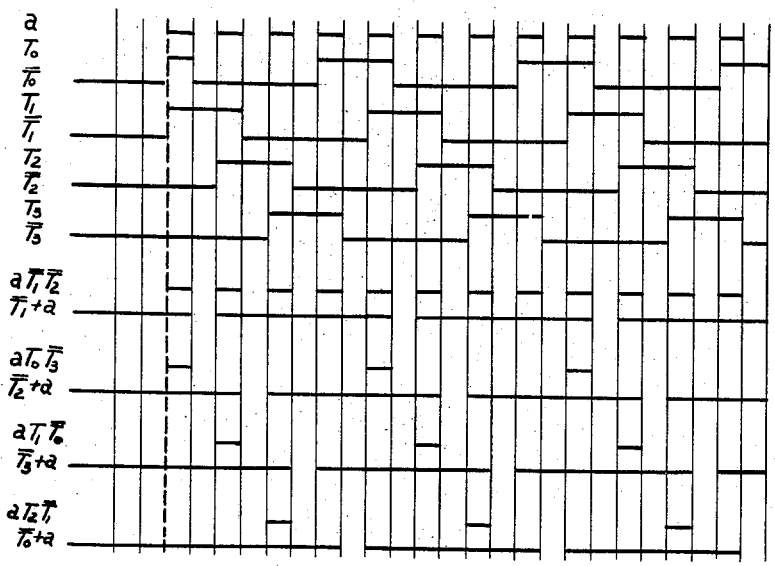
Figures 10, 12:
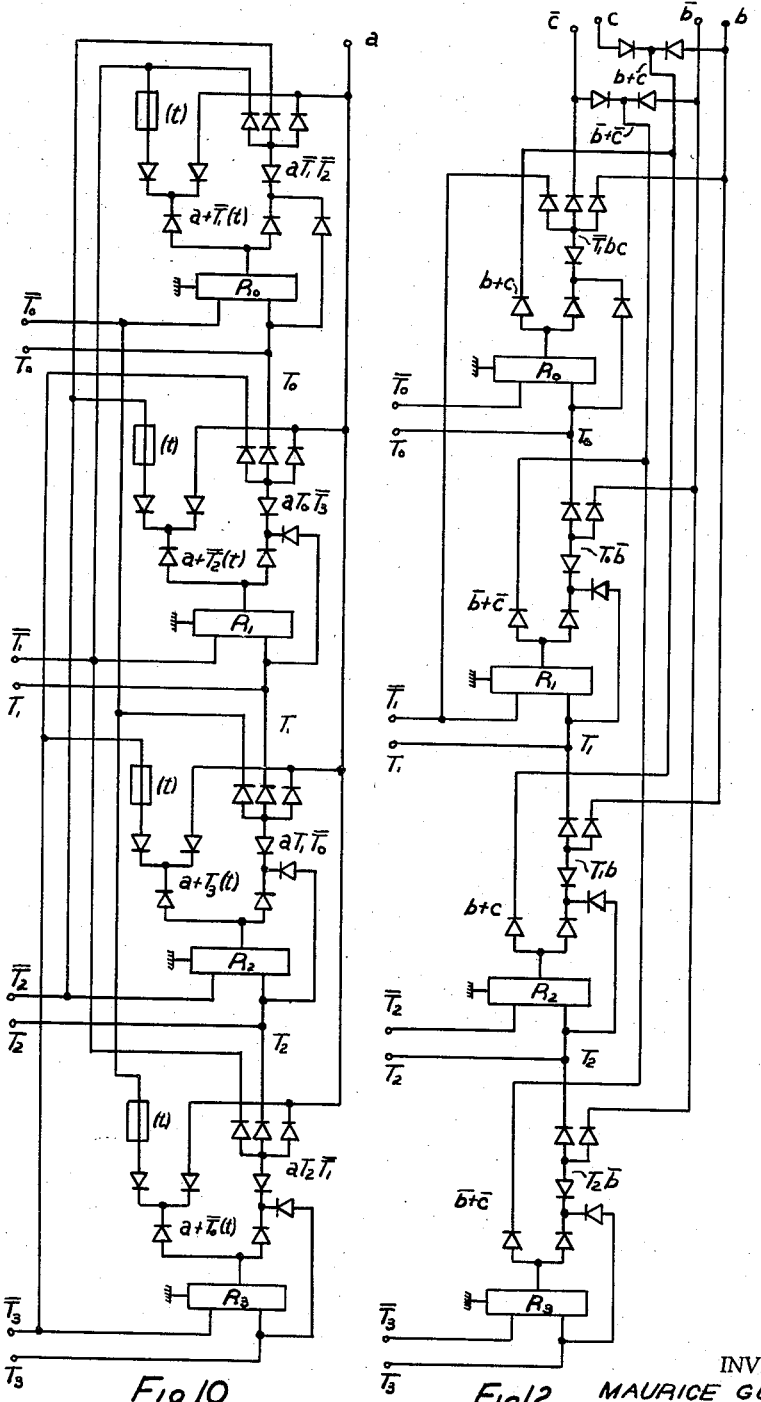
Figure 13:
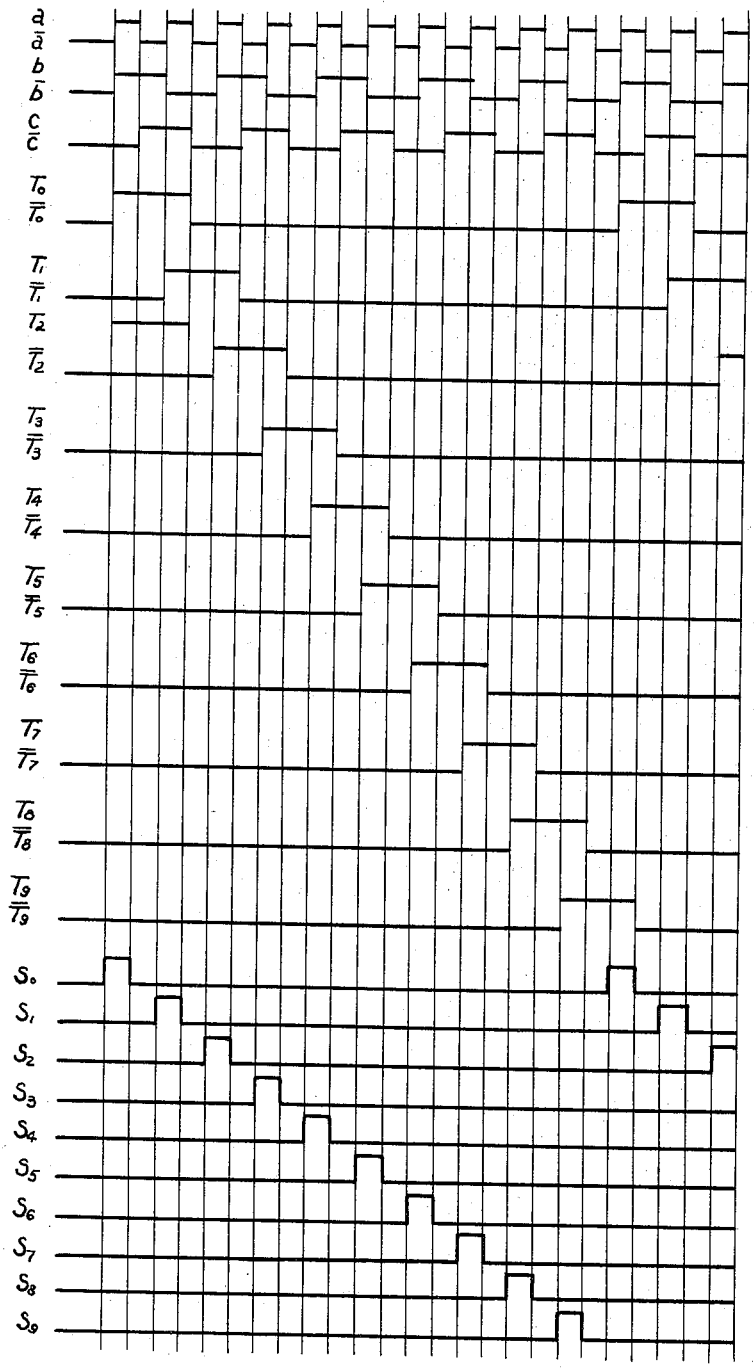
Figure 14:
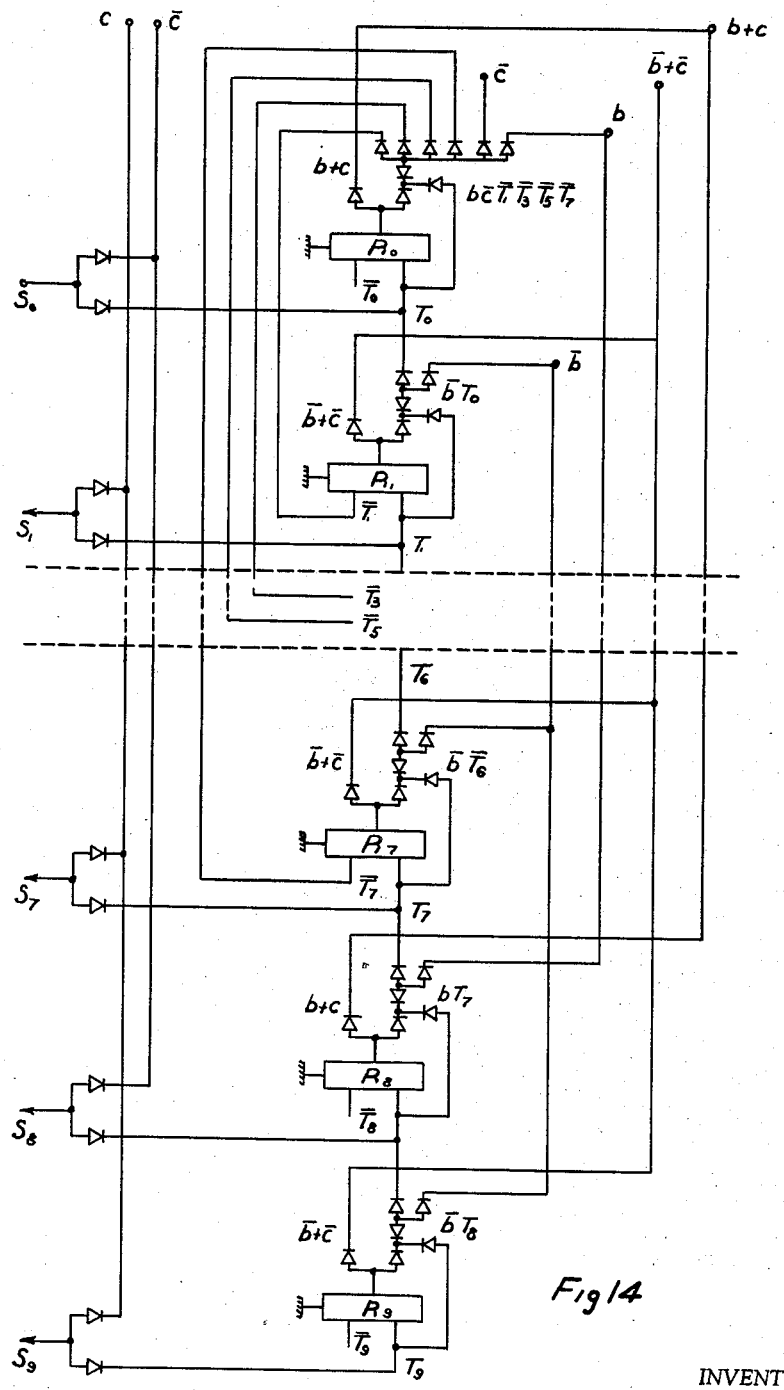

Figs. 10, 12 and 14 illustrate various embodiments of the invention, and Figs. 9, 11 and 13 show graphs explaining the respective operations of the devices embodying the invention, shown in Figs. 10, 12 and 14 respectively.

Figures 1, 2, 3, 4:
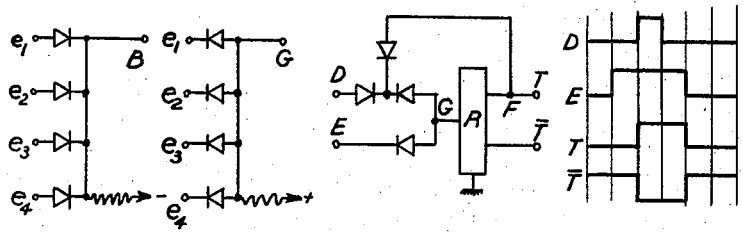

Four input signals $e_1$, $e_2$, $e_3$, $e_4$ are assumed to exist in the networks of Figs. 1 and 2, though of course these networks may easily be arranged for any number of input signals. These signals further are here supposed to consist of two-level voltages, a higher value level and a lower value level. A signal consisting of a voltage pulse will appear at an input terminal when the voltage at this terminal rises from its lower value to its higher value and an absence of signal will maintain the voltage at such terminal at its lower value. Such an arrangement may be reversed at will, and operations are transferred from the network of Fig. 1 to the network of Fig. 2 and increased for such a reversal of directions of the incoming signals.

In the network of Fig. 1, each input terminal is connected to an anode of an unidirectionally conducting element such as a germanium crystal diode. The cathodes of the diodes are connected to a common negative bias resistor. The output terminal B is connected to their common point. The input terminals and the value of the resistor are so chosen that the diodes are conducting when no higher voltage value is present on these terminals and the current absorbed through the common resistor suffices for maintaining a low potential at the output terminal B.

When a signal appears at any one of the input terminals, for instance at $e_1$, this signal passes to common point B and the potential of the corresponding output rises to its higher value. The other diodes are then blocked. The same would occur if the signal appears at any other input terminal. When two incoming signals coexist, the stronger one is brought to the common point.

In such a network, an output signal appears each time at least one of the input signals exists. When these input signals are voltage pulses of the same uniform amplitude or level, the potential of output terminal B can assume two values, a low value when no signal is present and a higher value when one or more of the input signals exist. According to the Boolean terminology, such a network realises an operation of union and can be called an "Or-gate" according to a more technological terminology.

In the network of Fig. 2, on the other hand, the diodes have their cathodes separately connected to the input terminals and their anodes connected at a common point which receives a positive bias voltage and from which there is derived the output terminal G. The potential values are so provided with respect to the resistance values that only when all input signals exist, the voltage at G can assume its higher value. When no input signal exists or at least a part only exists of the whole set of input signals, the common point, and consequently, output terminal G, will remain at their lower voltage value. In such a case, any conductive diode will bring its low cathode potential to each common point and output terminal even if one or more, but not all, of the diodes be blocked.

Such a network, like that of Fig. 2, acts as a circuit effecting the logical operation of intersection or junction. In a more technological terminology, such a network can be termed an "And-gate."

In such networks, as shown, the input signals are "positive," viz. appear as voltage rises from a determined value of potential. If the signals are "negative," viz. appearing as voltage drops from a determined potential value, the operation of the network in Fig. 1 will be that of an "And-gate" and the operation of the network in Fig. 2, that of an "Or-gate."

For the purpose of simplification, positive signals will only be considered and further, in the drawings, the biassings will be omitted in such networks.

A pulse-regenerative amplifier normally receives distorted pulses and serves to reconstitute pulses regenerated in shape, time and amplitude. In the regenerative process calibrated clock pulses are used, having flat tops of definite duration between fairly steep leading and trailing edges.

A pulse-regenerative amplifier of simple constitution is given on Fig. 3 wherein the amplifier tube with its conventional output transformer is represented by a block R, provided with at least one output T and often with a second output $\overline{T}$, for the complementary signal of the main output T. A tap F is indicated in the output T for the maintenance feedback which has been defined above. The signal to be regenerated is applied to the input terminal D of an "Or-gate"; the other input is connected to the feedback. The output terminal B of this "Or-gate" is connected to the input of an "And-gate" which, at its other input terminal E receives a clock signal. It is the output terminal G of this "And-gate" which is connected to the input of amplifier R.

Figures 5, 6:
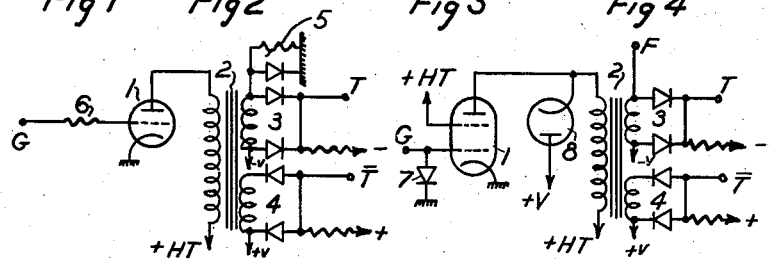
Figs. 5 and 6 illustrate two circuit lay-outs for a pulse-regenerative amplifier in the R portion of Fig. 3.

Two embodiments of the amplifier R and its associated circuitry are illustrated in Figs. 5 and 6. Their common feature is the inclusion of a vacuum tube 1 the high battery supply of which is applied through the primary winding of a transformer 2 provided with two oppositely wound secondary windings 3 and 4. Thus at output terminal T of secondary winding 3, the repeated signal represents the signal applied to the control grid of the tube whereas, at the output terminal $\overline{T}$ of secondary winding 4, the signal will always be of opposite direction, viz. the complementary of the first signal at T.

Output terminal T forms as the output of a diode network of the "Or-gate" kind; its inputs are at the respective ends of the secondary winding 3. Similarly, output terminal $\overline{T}$ forms the output of another diode network of the same "Or-gate" kind; its inputs are the respective ends of the secondary winding 4. These arrangements provide for the elimination at these outputs of the backswing voltages which appear at the secondaries each time the plate voltage of the tube returns to its higher condition after having been lowered through the inductance of the primary winding by a conductive condition of the tube.

Feedback terminal F is arranged at a suitable end of the secondary winding 3. At this end, in Fig. 5, there is provided a diode network 5 which assures a limitation of the amplitude level of the feedback voltage as well as that of the output voltages. In Fig. 6, such a limiting action is introduced by means of a diode 8 branched off between the plate of the tube 1 and a suitable high voltage potential +V, which is lower than the battery supply voltage +HT. Base or threshold bias voltages $-v$ and $+v$ are also indicated at suitable ends of the secondaries.

Fig. 5 may be considered as relating to a regenerative circuit of less power dissipation as that of Fig. 6. In the first case, a voltage-limiting resistance 6 is serially inserted between the terminal G and the grid of the vacuum tube 1, which may consist of a mere triode. Preferably a multi-grid tube is used in the circuit of Fig. 6.

In the devices according to the invention which will be further described, the amplifier stages of the kind of Fig. 5 will be referred to by R provided with an alphabetical subscript, and those of the kind of Fig. 6, by R provided with a numerical subscript.

For the special provisions which will be made in accordance with the invention, such pulse-regenerative amplifiers of the above-described type are to be used in a different fashion as usual: the pulse-regenerative amplifier is not used to reshape a distorted pulse but to generate a pulse wherein the leading edge is determined by the leading edge of a pulse in an initiating signal and wherein the trailing edge is determined by the trailing edge of a pulse in a maintenance signal. The initiating signal will be applied to the D terminal and the maintenance signal to the E terminal of Fig. 3. The initiating and maintenance signals are calibrated signals and the maintenance signal begins, preferably although not necessarily, before the initiating signal—and naturally must last after the erasion of the initiating signal.

Referring to the graph of Fig. 4, there is shown a maintenance signal E lasting three elementary time intervals and an initiating signal D lasting one elementary time interval with a phase-lag of one elementary time interval with respect to the maintenance signal. At the beginning only of the second elementary time interval, output signals T and $\overline{T}$ appear, through the activation of the amplifier R. This occurs because the potential at G rises only at this instant of time. If no feedback were provided the output signals will merely last the second elementary time interval but, through this feedback process, they last the second and third elementary time intervals.

In the graph illustrated in Fig. 4, consequently, the output signal presents a duration which is double of that of the initiating signal and is shifted by one elementary time interval with respect to the maintenance signal. Such relationships can apparently be modified at will.

A device according to the invention for deriving from a main synchronisation signal a plurality of further synchronisation signals as specified above, is mainly characterised in that it includes a corresponding plurality of pulse-regenerative amplifiers, each of which includes an "And-gate" for the formation of an initiating signal from the intersection or junction of a main synchronisation signal, or a signal derived at least from it with at least one output signal from another pulse-regenerative amplifier in such plurality. An "Or-gate" has one input fed from the output of the "And-gate" and another input fed from a feedback connection from the pulse-regenerative amplifier output. A second "And-gate" has one input fed by the output of the "Or-gate" and another input is fed with a maintenance signal formed at least from the synchronisation signal or a derivative therefrom, and occasionally also from at least one of the output signals from other pulse-regenerative amplifiers in the plurality. In this case a second "Or-gate" is provided for the formation of a maintenance signal the output of which feeds the appropriate input of the second "And-gate." Thus as a result of the preselection of these signals for said pulse-regenerative amplifiers, each amplifier delivers a clock pulse synchronisation signal having a predetermined phase-shift with respect to any other clock pulse synchronisation signal delivered by any other pulse-regenerative amplifiers in the plurality of such amplifiers.

The term "derivative signal or signal derived from the main synchronisation signal" covers any synchronisation signal of a frequency demultiplied with respect to the main synchronisation signal and of a pulse duration related to the duration of the pulses in the main synchronisation signal in accordance with the demultiplication rate of frequency. Such derivative signals themselves, according to a feature of the invention, are further obtained from the main synchronisation signal through the same process and by similar arrangements as provided for the generation and distribution of the clock pulse synchronisation signals finally issuing from the overall arrangement of the device.

With a view of facilitating discrimination between the various synchronisation signals, the above-mentioned further synchronisation signals will now be called shifted clock pulse signals.

A detailed description of the invention proper will now be given with reference to the remaining figures of the attached drawings illustrating certain embodiments of the invention.

More specifically, in the embodiment of Fig. 10, no use is made of derivative synchronisation signals. In the embodiment of Fig. 12, four generation and distribution stages are provided whereas the embodiment of Fig. 14 shows a ten stage device.

Figure 8:
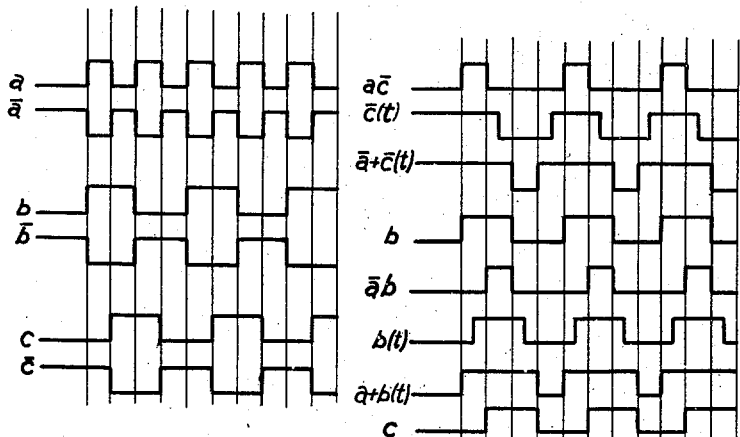
Fig. 8 shows graphs explaining the operation of the device of Fig. 7.

Referring first to the graphs of Fig. 8, the wave form of the main synchronisation signal $a$ and of its complementary signal $\bar{a}$ are shown for example, as delivered by the respective plate outputs of a bistable trigger stage actuated from a stabilised frequency oscillator. Such an arrangement is not shown, in detail as it does not form part of the present invention.

From this main signal $a$, a derivative signal must be formed, which presents the wave-form shown at $b$ and also the complementary wave-form at $\bar{b}$. Signal $b$ must be of the same phase of occurrence as the main signal $a$.

From these signals $a$ and $b$, another derivative signal must be formed, which presents the wave-form shown at $c$ and also the complementary wave-form shown at $\bar{c}$. Signals $c$ and $\bar{c}$ are the same duration of pulses as the $b$ and $\bar{b}$ signal wave-forms. Signals $c$ and $\bar{c}$ also must present a phase-lag of one elementary time interval with respect to the $b$ and $\bar{b}$ signals. The elementary time-intervals of operation are defined, as shown, by the main synchronisation signal $a$.

An elementary time interval is equal to one-half of a period of the main synchronisation signal. For the illustrated embodiments to be described later, any clock pulse signal will have pulses lasting three elementary time intervals. Each clock pulse in such signals might be reduced, if and when required, to a single elementary time-interval as will later be explained, but such a restriction is by no way imperative.

Figure 7:
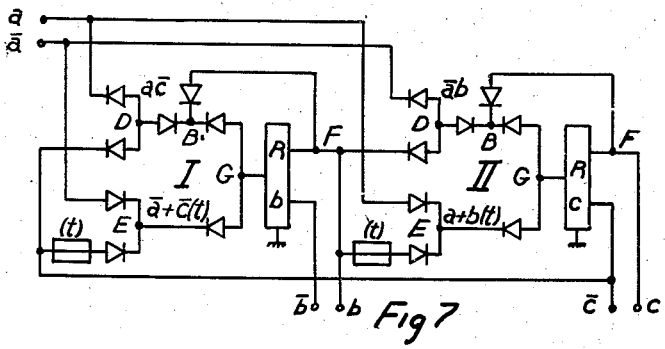
Fig. 7 shows a generator of signals derived from the main synchronization signal.

Referring to Fig. 7, a generator of derivative signals $b$ and $c$, comprises two pulse-regenerative amplifiers I and II in cascade connection whereby the $b$ output of the first amplifier stage $R_b$ is connected to one input of the "And-gate" for the formation of the initiating signal of the second amplifier stage $R_c$. A retroactive coupling from the $\bar{c}$ output from this second amplifier stage $R_c$ extends to one input of the second "Or-gate" for the generation of the maintenance signal in the first pulse-regenerative stage I, through a guard delay element $(t)$. This retroactive coupling also extends, without any delay, to one input of the first "And-gate" in the first stage for the generation of the initiating signal of said stage. It may be recalled that the first "And-gate" in any stage is the one having a D output; each first "Or-gate" of a stage is the one which presents a B output, each second "Or-gate" is the one which presents an E output, and each second "And-gate" of a stage is the one which presents a G output.

In a direction opposite to the above-mentioned retroactive coupling from stage II to stage I, a coupling is further provided from the $b$ output of the first stage to one input of the second "Or-gate" of the second stage II, through a guard delay element $(t)$.

The signal $b$ must be in phase with the main signal $a$. Consequently signal $a$ is applied to the other input of the first "And-gate" of stage I, whereby the initiating signal for this stage will start in phase with the main synchronisation signal $a$. On the other hand, signal $c$ must be in phase with the complementary signal $\bar{a}$, and consequently it is this signal $\bar{a}$ which is applied to the other input of the first "And-gate" of the second stage II.

The initiating signals for the pulse-regenerative stages of Fig. 7, thus formed, are $a.\bar{c}$ and $\bar{a}.b$. By introducing the $b$ signal as a component of the initiating signal of the first stage, and the $\bar{b}$ signal as a component of the initiating signal of the second stage, the demultiplication of frequency of the $b$ and $c$ pulses is achieved because these signals cancel the action of one pulse in two of the main synchronisation signals $a$ and $\bar{a}$. On the other hand, they assure the respective phase-locks of signals $b$ and $c$ with signals $a$ and $\bar{a}$.

If the main signal $\bar{a}$ were used alone as a maintenance signal for the first stage, the output signal would be interrupted by an elementary time interval between two consecutive pulses $\bar{a}$. The union with signal $\bar{a}$, of signal $\bar{c}$, with a slight delay for assuring the overlap of the signals, cancels this discontinuity. Any pulse in the $b$ signal will then be initiated by the leading edge of a pulse in the $a$ signal and will have its trailing edge shaped by the trailing edge of the pulse of the $\bar{a}$ signal which follows the pulse $a$ which controls the initiation, see the graph of Fig. 8.

In a similar fashion, if the main signal $a$ were only used as a maintenance signal for the second stage, the output signal would be interrupted between two consecutive $a$ pulses. The union with signal $a$, of signal $b$, with a slight delay for assuring the relative overlap of these signals, cancels this discontinuity. Any pulse of the $c$ signal will then be initiated by the leading edge of a pulse in the $\bar{a}$ signal and will have its trailing edge shaped by the trailing edge of the pulse of the $a$ signal which follows the pulse $\bar{a}$ which controls the initiation.

In the right-hand column of Fig. 8, the initiating and maintenance signals of the stages I and II of Fig. 7 are shown. These graphs are self-explanatory with respect to the $a$ and $b$ signals which are shown in the left-hand column.

An example of an embodiment wherein four clock pulse signals, T0, T1, T2, T3, must be generated without making use of the above-given derivative signals of the main synchronisation signal, will now be described with reference to the graphs of Fig. 9 and the circuit diagram of Fig. 10. Each clock pulse synchronisation signal is phased with respect to the main synchronisation signal $a$, but each clock pulse lasts three elementary time intervals instead of one and, further, each clock pulse synchronisation signal presents a phase-shift of one elementary time interval with respect to the next preceding clock pulse signal. In Fig. 9, the various plotted signals are represented by lines defining their intervals of higher voltages; their intervals of lower voltage value are merely indicated by interruptions in such lines.

Referring to Fig. 10, four regenerative amplifiers are connected in a chain in which the output T0 of the first amplifier R0 is applied to one input of the first "And-gate" of the second stage, the output T1 of said second stage amplifier R1 is applied to one input of the first "And-gate" of the third stage; the output T2 of second stage amplifier R2 is applied to one input of the first "And-gate" of the fourth stage, including the amplifier R3.

Since the clock pulse synchronisation signals are phased with respect to the main synchronisation signal $a$, this signal will be sufficient for the determination of the initiating and maintenance signals of these pulse-regenerative amplifiers, when combined with certain of the complementary signals of clock pulses from the regenerative stages. This main synchronisation signal $a$ is systematically applied to one input of the first "And-gates" and of the second "Or-gates" of all stages.

Each initiating signal for a stage must only be repeated at intervals equal to four pulse periods of the main synchronisation signal and no such signal exists at that frequency. Consequently, the main signal $a$ must be combined with at least two other signals appearing in the device.

For the first pulse-regenerative stage, the "And-gate" forming the initiation signal will combine with the $a$ pulses, the voltages $\bar{T1}$ and $\bar{T2}$, brought back respectively from the complementary outputs of the amplifiers R1 and R2. The initiating signal of the first pulse-regenerative stage will thus be $a.\bar{T1}.\bar{T2}$ as indicated in both Figs. 9 and 10. It will be noted from the graphs that signals $\bar{T1}$ and $\bar{T2}$ only coexist at the required frequency of four pulse periods of the main synchronisation signal.

The maintenance of the output signal from the first stage must be formed by the union of the signal $a$ and of a signal assuring the continuity of this maintenance throughout three elementary time intervals. Such is the case of the complementary signal $\bar{T1}$, and this signal is applied with the main $a$ signal to the second "Or-gate" of the first stage. A slight delay ($t$) is provided for assuring the definite overlap between the $a$ and the $\bar{T1}$ signals.

In accordance with a similar reasoning, and as may be noted from in the graphs of Fig. 9, the initiation signal for the second stage consists of the combination $a.T0.\bar{T3}$, and its maintenance signal consists of the reunion of the signals $a+\bar{T2}$. The initiating signal for the third stage consists of the intersection or junction of the signals $a.T1.\bar{T0}$, and the maintenance signal consists of the union of the signals $a+\bar{T3}$. The initiating signal for the fourth stage consists of the intersection or junction of the signals $a.T2.\bar{T1}$ and the maintenance signal of this stage consists of the union of the signals $a+\bar{T0}$.

It is to be noticed, however, that the first cycle of generation of the clock pulse signals cannot be used; it is defective in itself, as apparent from Fig. 9, since the signals T0 and T1 will simultaneously be initiated (T0 during one elementary time interval). The operation however becomes correct from the second cycle of operation. Further, the delays ($t$) must be provided for a reliable operation.

For such reasons, it appears preferable to have recourse to derivative signals such as the $b$ and $c$ signals, obtained in accordance with the scheme of Figs. 7 and 8, from which are derived further signals by the unions $b+c$ and $\bar{b}+\bar{c}$. Fig. 12 shows such modification of Fig. 10, and the simplification of the controls is apparent from the second over the first.

Referring to the graphs of Fig. 11, relating to the arrangement of Fig. 12, it may be seen that the maintenance signals can merely be $b+c$ for the stages of odd rank and $\bar{b}+\bar{c}$ for the stages of even rank in the chain. Such a condition remains true for any number of stages, as shown in Fig. 14.

The advantage of the recourse to derivative signals increases as increases the number of clock pulse synchronisation signals to be generated.

From another point of view, any initiating signal, except for the first stage of the device, is merely obtained by the intersection of the signal issuing from the next preceding stage, with either the $b$ or the $\bar{b}$ signal, viz. the $b$ signal for the stages of odd rank and the $\bar{b}$ signal for the stages of an even rank. The initiating signal of the first stage may be obtained from the intersection $\bar{T1}.b.\bar{c}$, whereby a single retroactive connection remains within the device from the second stage to the first, in a four-stage device such as the one shown in Fig. 12.

However in order to obtain the first stage initiating signal, for a greater number of stages recourse must be had (see for instance Fig. 14 and the corresponding graphs of Fig. 13), to other complementary signals from other stages of the device. In a ten stage device such as shown in Fig. 14, the initiating signal for the first stage may be obtained from the intersection of the signals $$b.\bar{c}.\bar{T1}.\bar{T3}.\bar{T5}.\bar{T7}$$

It may, as an alternative, be obtained by providing the intersection of the signals $b.\bar{c}.\bar{T2}.\bar{T4}.\bar{T6}.\bar{T1}$.

From a more general point of view, the initiating signal for the first stage must include at least the complementary signal issuing from the second stage and as many complementary signals from other stages as needed, such as determined from a graphical analysis of the operation of the device in accordance with graphs such as are shown in Fig. 11 for the device of Fig. 12 or in Fig. 13 for the device of Fig. 14. Thus, any extension of the illustrated devices to any number of pulse-regenerative stages is easily obtained.

If now in a device such as disclosed in Fig. 14, it is required to reduce to one elementary time interval any outgoing clock pulse from any stage, this may be easily carried out by providing output "And-gates." Each output gate receives on one of its two inputs, the generated clock pulse signal and on the other of its inputs either the $c$ signal, for any stage of an even rank in the device, or the $\bar{c}$ signal for any stage of an odd rank in the device. As an alternative, the $b$ and $\bar{b}$ signals may be applied to such output gates, in which case the issuing signals such as S1, . . . , S9 would have a duration of two elementary time intervals and their succession in time would appear as a continuous signal, otherwise said their respective pulses would be juxtaposed with respect to time. However, output arrangements of such kinds are not necessarily required in devices according to the present invention.

Of course, any technological alternatives to the embodiments described and shown do not preclude the resulting devices from falling within the scope of the invention as defined by the appended claims.

We claim:

1. In a device for generating and distributing to separate channels a plurality of clock pulse synchronization signals having predetermnied phase shifts with respect to each other, a corresponding plurality of pulse regenerative amplifiers including separate outputs for at least some of them, means including a source of initiating signals for sequentially initiating operations of each one of said pulse regenerative amplifiers under control of a main synchronization signal and of at least one of the outputs from a pulse regenerative amplifier other than said one pulse regenerative amplifier, and means for forming a maintenance signal under control of said main synchronization signal and for maintaining said sequentially initiated operation during a predetermined interval of time under control of said maintenance signal; each of said pulse regenerative amplifiers being provided with a gating circuit and a feedback connection from the output of said pulse regenerative amplifier to one input of said gating circuit, its other input receiving the initiating signal, and a further junction circuit combining the signal resulting from the gating circuit with said maintenance signal, and controlling activation in said pulse regenerative amplifier.

2. A device according to claim 1, wherein said gating circuit is constituted by an "Or-gate" network and said junction circuit, by an "And-gate" network.

3. A device according to claim 1, wherein each initiating signal for a pulse-regenerative amplifier is formed by an intersection circuit combining at least one output signal from another pulse-regenerative amplifier, and at least said main synchronisation signal.

4. A device according to claim 3, wherein said junction circuit consists of an "And-gate" network.

5. A device according to claim 3, wherein said junction circuit forming said initiating signal for a pulse-regenerative amplifier is adapted to receive said main synchronisation signal, the direct wave-form of the output signal from the next preceding pulse-regenerative amplifier in the sequence of operations of said amplifiers, and at least the complementary wave-form of another output of another pulse-regenerative amplifier, and wherein said junction circuit for the first pulse-regenerative amplifier in said sequence is adapted to receive another complementary wave-form derived at least from another pulse-regenerative amplifier in replacement of said direct wave-form signal applied to any other junction circuit for forming the initiating signal for any other pulse-regenerative amplifier.

6. A device according to claim 3, wherein each maintenance signal for a pulse-regenerative amplifier in said plurality is formed by a gating circuit uniting said main synchronisation signal with at least one complementary wave-form derived from the output of another pulse-regenerative amplifier.

7. A device according to claim 6, wherein each gating circuit forming a maintenance signal consists of an "Or-gate" network.

8. A device according to claim 6, wherein said union circuit for forming the maintenance signal of a pulse-regenerative amplifier is adapted to receive said main synchronisation signal and the complementary wave-form derived from the output of the pulse-regenerative amplifier which is the next following in the sequence of operations of the device, the union circuit of the first pulse-regenerative signal in said sequence receiving the complementary wave-form derived from the last pulse-regenerative amplifier in said sequence of operations.

9. A device according to claim 8, comprising means for delaying said complementary wave-form by a time interval lesser than the time interval of half a period of said main synchronisation signal.

10. In a device for generating and distributing to separate channels a plurality of clock pulse synchronization signals having predetermined phase shifts with respect to each other, a corresponding plurality of pulse-regenerative amplifiers including separate outputs for at least some of them, means for sequentially initiating operations of each one of said pulse-regenerative amplifiers under control of a main synchronization signal and of at least one of the outputs from a pulse-regenerative amplifier other than said one pulse regenerative amplifier, said initiating means including a junction circuit for forming an initiating signal and means for forming a derivative signal at least from said main synchronization signal, and said junction circuit being adapted to receive at least one output signal from said other pulse-regenerative amplifier and at least one derivative signal; and means for forming a maintenance signal under control of said main synchronization signal and for maintaining said sequentially initiated operations during a predetermined interval of time under control of said maintenance signal; each of said pulse regenerative amplifiers being provided with a gating circuit and a feedback connection from the output of said pulse regenerative amplifier to one input of said gating circuit, its other input receiving the initiating signal, and a further junction circuit combining the signal resulting from the gating circuit with said maintenance signal, and controlling activation in said pulse regenerative amplifier.

11. A device according to claim 10, wherein each intersection circuit forming such an initiating signal consists of an "And-gate" network.

12. A device according to claim 10 wherein said means for forming derivative signals from said main synchronisation signal comprise means for forming a first derivative signal phased with said main synchronisation signal and a second derivative signal having a predetermined phase-shift with respect to the first, both signals having the same frequencies and durations of their pulses which are demultiplied in a predetermined ratio with the frequency and pulse duration of said main synchronisation signal.

13. A device according to claim 12, wherein said means for forming such derivative signals from said main synchronisation signal comprise a pair of pulse-regenerative amplifiers, means for forming an initiating signal for the first of said pulse-regenerative amplifiers from the intersection combination of the direct wave-form of said main synchronisation signal and of the complementary wave-form derived from the second of said pulse-regenerative amplifiers, means for forming a maintenance signal for said first amplifier from the union combination of the complementary wave-forms of both the main synchronisation signal and the output from said second amplifier, means for forming an initiating signal for the second amplifier from the intersection combination of the direct wave-form derived from the first amplifier and the complementary wave-form of the main synchronisation signal, means for forming the maintenance signal for said second amplifier from the union combination of the main synchronisation wave-form and the direct wave-form from said first amplifier, and means for separately collecting the one and the other of said derivative signals in both their wave-forms.

14. A device according to claim 13, wherein means are provided for forming the union combination of the direct wave-forms of said first and second derivative signals, on the one part, and the union combination of the complementary wave-forms of said first and second derivative signals, on the other part, means for further forming the intersection combination of the direct wave-form of said first derivative signal and of the complementary wave-form of said second derivative signal, and of at least one complementary wave-form output from a pulse-regenerative amplifier other than the first one in their sequence of operations, whereby the initiating signal of the operation of said first amplifier in formed, means for applying to the intersection circuits of the other pulse-regenerative amplifiers of an even rank in said sequence both the direct wave-form derived from the next preceding amplifier in the sequence and the complementary wave-form of said first derivative signal, means for further applying to the intersection circuit of the other pulse-regenerative amplifiers of an odd rank in said sequence both the direct wave-form derived from the next preceding amplifier in the sequence and the direct wave-form of said first derivative signal, means for applying as a maintenance signal to all pulse-regenerative amplifiers of an odd rank in the sequence the above union combination of the direct wave-forms of said derivative signals, and means for applying to all pulse-regenerative amplifiers of an even rank in the sequence the union combination of the complementary wave-forms of said derivative signals.

15. A device according to claim 12, wherein each output channel of a clock pulse synchronisation signal includes an intersection circuit combining its clock pulse signal with the one or the other of said derivative signals.

16. A device according to claim 12, wherein both said derivative signals are of half the frequency of the main synchronisation signal and of a pulse duration equal to a complete period of $s$ pulse in said main signal and wherein their relative phase-shift is equal to half a period of said main synchronisation signal.

17. A device according to claim 14, wherein means are provided for applying to the means for forming the intersection combination resulting in the initiating signal of the first pulse-regenerative amplifier in the said sequence, the complementary wave-form derived from the second amplifier in the sequence and at least some of the complementary wave-forms derived from the amplifiers of an even rank in said sequence.

18. A device according to claim 14, wherein means are provided for applying to the means for forming the intersection combination resulting in the initiating signal of the first pulse-regenerative amplifier in the said sequence, the complementary wave-form issuing from the second amplifier and at least some of the complementary wave-forms derived from the amplifiers of an odd rank in said sequence.

References Cited in the file of this patent

UNITED STATES PATENTS

| | | |
|---|---|---|
| 2,199,634 | Koch | May 7, 1940 |
| 2,462,111 | Levy | Feb. 22, 1949 |
| 2,486,491 | Meacham | Nov. 1, 1949 |
| 2,670,445 | Felker | Feb. 23, 1954 |
| 2,712,065 | Elbourn | June 28, 1955 |
| 2,760,087 | Felker | Aug. 21, 1956 |
| 2,790,900 | Feissel | Apr. 30, 1957 |